United States Patent [19]
Horner et al.

[11] Patent Number: 5,912,519
[45] Date of Patent: Jun. 15, 1999

[54] ENERGY STORAGE AND CONVERSION APPARATUS

[75] Inventors: Roger Eric Horner; Colin David Tarrant; Ian Crombie; Geoffrey Martin Barker; David Stephen Hayward, all of Cheshire, United Kingdom

[73] Assignee: British Nuclear Fuels PLC, Cheshire, United Kingdom

[21] Appl. No.: 09/055,769

[22] Filed: Apr. 7, 1998

Related U.S. Application Data

[62] Division of application No. 08/776,768, filed as application No. PCT/GB95/01840, Aug. 2, 1995.

[30] Foreign Application Priority Data

Aug. 8, 1994 [GB] United Kingdom .................. 9416020

[51] Int. Cl.$^6$ .............................. H02K 7/02; H02K 7/09; H02K 21/12; H02K 1/27
[52] U.S. Cl. ......................... 310/74; 310/90.5; 310/156; 310/261
[58] Field of Search .......................... 310/74, 90.5, 157, 310/261, 156; 74/572

[56] References Cited

U.S. PATENT DOCUMENTS

| | | | |
|---|---|---|---|
| 3,683,216 | 8/1972 | Post | 310/74 |
| 3,936,682 | 2/1976 | Gates | 310/90.5 |
| 4,058,024 | 11/1977 | Gordon | 74/572 |
| 4,223,240 | 9/1980 | Theyse | 310/74 |
| 4,819,502 | 4/1989 | Nakajima et al. | 74/572 |
| 4,860,611 | 8/1989 | Flanagan et al. | 74/574 |
| 4,868,479 | 9/1989 | Byong-Ho et al. | 318/721 |
| 4,870,310 | 9/1989 | Triplett | 310/74 |
| 4,957,883 | 9/1990 | Kobayashi et al. | 501/35 |
| 5,065,060 | 11/1991 | Takahashi et al. | 310/74 |
| 5,284,391 | 2/1994 | Diel et al. | 384/108 |
| 5,566,588 | 10/1996 | Bakholdin et al. | 310/74 |
| 5,628,232 | 5/1997 | Bakholdin et al. | 74/572 |

FOREIGN PATENT DOCUMENTS

| | | |
|---|---|---|
| 0 137 759 | 4/1985 | European Pat. Off. . |
| 0 221 495 | 5/1987 | European Pat. Off. . |
| 2 336 568 | 7/1977 | France . |
| 2 050 108 | 4/1972 | Germany . |
| 27 54 623 | 6/1979 | Germany . |
| 42 00 824 | 7/1993 | Germany . |
| 1092732 | 11/1967 | United Kingdom . |
| 2 172 752 | 9/1986 | United Kingdom . |
| WO 92/12566 | 7/1992 | WIPO . |
| WO 94/06193 | 3/1994 | WIPO . |

OTHER PUBLICATIONS

Derwent File 350, RD 195053, "Generator Rotor—with End Windings Covered . . . ", Jul. 10, 1980, 1 p.
Database WPI, Section PQ, Week 8722, Abstract No. 87–155500 attached to SU 1262157, Oct. 7, 1986, 3 p.
Kirk, James A. et al., Overview of a Flywheel Stack Energy Storage System, Proceedings of the 23$^{Rd}$ Intersociety Energy Conversion Engineering Conference, vol. 2, Jul. 31–Aug. 5, 1988, pp. 25–30.
Lenger, A., "Elektrische Energieopslag Met Behulp Van Een Vliegwiel", PT Elektrotechniek Electronica, vol. 32, No. 6, 1977, pp. 302–309.

(List continued on next page.)

*Primary Examiner*—Clayton LaBalle
*Attorney, Agent, or Firm*—Nixon & Vanderhye PC

[57] ABSTRACT

An energy storage and conversion apparatus (1) comprising a containment (5) defining a vacuum chamber (7), a substantially vertical shaft within the vacuum chamber (7), a stator (11) on the shaft (9), and a cylindrical rotor (13) which, in is driven by the stator (11) to store energy as kinetic energy of the rotor (13) and acts with the stator (11) as a generator to release energy, wherein the rotor (13) is supported by the shaft (9) via an end cap (29), positioned at the upper end of the cylindrical rotor (13), which engages the shaft (9). The rotor (13) is suspended from a pin bearing (31) which is attached to an end cap (29). The pin bearing (31) sits in a bearing cup (37) mounted in a damper (39) at the end of the shaft (9). A magnet bearing (43) is provided at the lower end of the rotor (13) to assist in positioning the rotor (13) relative to the stator (11).

12 Claims, 5 Drawing Sheets

OTHER PUBLICATIONS

Plant, David P. et al., Improvements in Magnetic Bearing Performance for Flywheel Energy Storage, Proceedings of the 23$^{Rd}$ Intersociety Energy Conversion Engineering Conference, vol. 2, Jul. 31–Aug. 5, 1988, pp. 111–116.

Patent Abstract of Japanese Appl. No. 58–037352, vol. 7, No. 120 (M–217), May 25, 1983, 1 p.

Patent Abstract of Japance Appl. No. 59–029854, vol. 8, No. 128 (M–302), Jun. 14, 1984, 1 p.

Patent Abstract of Japanese Appl. No. 61–009135, vol. 10, No. 150 (E–408), May 31, 1986, 3 p.

Patent Abstract of Japanese Appl. No. 62–288386, vol. 12, No. 179 (M–701), May 26, 1988, 1 p.

Patent Abstract of Japanese Appl. No. 63–058514, vol. 12, No. 278 (P–738), Aug. 1, 1988, 1 p.

Patent Abstract of Japanese Appl. No. 2–017842, vol. 14, No. 161 (E–0909), Mar. 28, 1990, 6 p.

ENERGY STORAGE AND CONVERSION APPARATUS

This is a divisional of application Ser. No. 08/776,768, filed Feb. 28, 1997, now pending, and a 371 of PCT/GB95/01840 filed Aug. 2, 1995.

BACKGROUND OF THE INVENTION

This invention relates to energy storage and conversion apparatus, and in particular to an apparatus wherein a cylindrical rotor is driven by a stator within the rotor to store energy as kinetic energy of the rotor and wherein energy can be withdrawn from the rotor when the stator and rotor act as a generator.

Energy storage and conversion apparatus of the aforementioned type have already been described in some of the present applicant's earlier patent specifications. The applicant has, however, continued to develop its energy storage and conversion apparatus and, as a result thereof, has designed an apparatus according to the present invention.

SUMMARY OF THE INVENTION

According to a first aspect of the present invention, there is provided an energy storage and conversion apparatus comprising a containment defining a vacuum chamber, a substantially vertical shaft within the vacuum chamber, a stator on the shaft, and a cylindrical rotor which, in use, is driven by the stator to store energy as kinetic energy of the rotor and acts with the stator as a generator to release energy, wherein the rotor is supported by the shaft via an end cap, positioned at the upper end of the cylindrical rotor, which engages the shaft.

By suspending the rotor from the shaft about the stator, a very neat, compact and reliable energy storage and conversion apparatus results.

In a preferred embodiment, the end cap includes a central pin bearing acting on the upper end of the shaft. The pin bearing preferably includes a substantially spherical head.

More preferably, the pin bearing is a spherical spiral groove hydrodynamic pin bearing. The pin bearing may be formed from steel, the spiral groove being etched into the surface of the spherical head.

By using a spherical spiral groove pin bearing, high axial loads can be accommodated with only very small friction losses. In contrast, normal prior art energy storage and conversion apparatus use either conventional roller bearings, which result in high friction losses, or electromagnetic bearings which are complicated, costly and potentially unreliable.

The pin bearing is preferably received in a bearing cup mounted in a damper at the end of the shaft. More preferably the damper includes oil which also acts to lubricate the pin bearing.

The end cap may be formed from a composite material, such as a carbon fibre composite, aluminium, maraging steel or any other appropriate material.

In one embodiment, the end cap is received in the upper end of the cylindrical rotor by means of a friction fit. Alternatively, the end cap may be physically joined to the cylindrical rotor by any appropriate means.

A magnet bearing is preferably provided towards the lower end of the rotor to assist in positioning the rotor relative to the stator. The magnet bearing is preferably a permanent magnet bearing acting between the shaft and the rotor. Alternatively, the magnet bearing may be an electromagnet bearing.

If a permanent magnet bearing is used, annular rings of north and south poles are preferably provided on the inside surface of the rotor and on the shaft such that the opposing poles repel. If such an arrangement is used, the rotor is held out of contact with the stator and may, if the arrangement, number and position of the poles is chosen carefully, assist in lifting the rotor slightly to reduce the pressure of the pin bearing.

In another embodiment, a magnet bearing may act on the lower end of the cylindrical rotor from below to assist in lifting the rotor.

According to a second aspect of the present invention, there is provided an energy storage and conversion apparatus comprising a base member, a containment mounted on the base member defining a vacuum chamber, a substantially vertical shaft within the vacuum chamber, a stator on the shaft, and a cylindrical rotor which, in use, is driven by the stator to store energy as kinetic energy of the rotor and acts with the stator as a generator to release energy, wherein the shaft is mounted to the base member such that, in the event of a failure of the apparatus, the energy stored in the rotor is preferentially transferred to the shaft rather than to the containment.

By providing an apparatus of this kind, torque forces resulting from a crashing rotor will not all impact themselves on the machine containment as is the case in many prior art flywheel energy storage and conversion systems. Instead the torque forces will be transmitted via the stator to the central shaft and from the shaft either directly to the machine base plate or be dissipated in a friction joint on the shaft (for example between the motor/generator and the shaft). The containment may therefore have a reduced wall thickness than is normally required to withstand such high energy dissipation.

Preferably the spacing between the rotor and the stator on the shaft is substantially less than the spacing between the rotor and the containment. This arrangement ensures that, if a rotor does fail, it will crash initially into the stator/shaft unit rather than the containment wall. Energy will, therefore, be transferred to the base member immediately upon failing of the apparatus or be dissipated in the friction joint on the shaft.

The base member may include a recess for receiving an end of the shaft, the shaft being received in the recess with a tight fit. Other ways of engaging the shaft with the base member can, of course, alternatively be used (for example, a friction joint for energy dissipation).

Preferably the shaft is formed of high strength aluminium. Any other suitable material could alternatively be used.

Preferably the shaft is hollow to accommodate a pin bearing for supporting the rotor. The shaft may, however, simply have a recess at its upper end for receiving the pin bearing, rather than being completely hollow.

The base member is preferably adapted to be attached to a support having significant mass which safely disperses energy from the rotor, if necessary.

Although not essential for the implementation of the present invention, the length of the rotor is preferably at least twice the external diameter of the rotor. If this requirement is satisfied, however, a tall relatively thin unit is provided which includes a significant length of shaft per mass of rotor. Hence, a safer apparatus may result. Furthermore, by forming a tall, relatively thin unit, a larger number of units can be accommodated in any given floor area than is the case with the known prior art apparatus.

According to a third aspect of the present invention, there is provided an energy storage and conversion apparatus comprising a containment defining a vacuum chamber, a substantially vertical shaft within the vacuum chamber, a stator on the shaft, and a cylindrical rotor which, in use, is driven by the stator to store energy as kinetic energy of the rotor and acts with the stator as a generator to release energy, wherein the rotor comprises an inner layer of glass fibre and an outer layer of carbon fibre. More preferably, the inner layer is a glass fibre composite material and the outer layer is a carbon fibre composite material. In a preferred embodiment, the glass fibre composite is E-glass.

By not including any solid metallic components in the rotor, which is in marked contrast to most of the prior art apparatus other than the present applicant's apparatus, there is less likelihood that a rotor failure and consequent flying debris will result in rupture of the apparatus containment. Indeed, by using a glass/carbon fibre composite rotor and carbon fibre end cap design rotating closely about the central shaft, the rotor may even remain essentially intact during a crash situation.

Preferably the inner layer of the rotor contains a material magnetised to form a multipolar magnetisation for interaction with the stator, during use. More particularly, the inner layer preferably includes an annulus of alternating north and south poles which enable the stator, having a number of poles produced by the stator core with windings thereon, to drive the rotor to store energy.

Further, the inner layer of the rotor may contain a material magnetised to form at least one homo-polar radial magnetisation for interaction with a magnet mounted on the shaft to produce a bearing for the rotor. As indicated above, a number of homo-polar radial magnetisations may be provided, thereby resulting in an improved bearing providing a degree of lift to the rotor. The arrangement may also include an axial magnet thrust bearing which acts against the bottom face of the rotor, thereby further improving the degree of lift to the rotor.

The magnetised material is preferably a powder introduced into the inner layer of the rotor during manufacture. The powder may be ferrite or NdFeB. Any other appropriate material could, of course, alternatively be used.

The inner and outer layers are preferably strain matched to prevent separation during use.

The thickness of the inner layer is preferably about two thirds of the thickness of the complete rotor. By producing a rotor having these dimensions, the rotor has a significant amount of mass provided by the glass composite and yet is held together during spinning of the rotor by virtue of the strong external layer of carbon fibre composite. With this in mind, the rotor may spin at between approximately 1,200 Hz and 1,800 Hz, for example.

The magnetised material preferably extends from the inner surface of the inner layer to about half way through the inner layer. The depth of the magnetised material can, of course, be altered to suit the requirements of a particular rotor/stator configuration.

As mentioned above, an end cap of the rotor, preferably including a pin bearing, may assist in suspending the rotor on the shaft.

According to a fourth aspect of the present invention, there is provided an energy storage and conversion apparatus comprising a plurality of stators, a corresponding plurality of cylindrical rotors arranged to rotate about the stators and means for containing the stators and rotors, the stators in use driving the rotors to store energy as kinetic energy of the rotors and interacting with the rotors to act as generators to release energy, wherein the containment means define a plurality of chambers within a unitary structure in which the stators and rotors are accommodated.

As far as the applicant is aware, a single structure accommodating a plurality of energy storage and conversion apparatus units has never before been suggested.

The unitary structure preferably comprises a honeycomb-type structure in which a plurality of cylindrical chambers are regularly arranged.

Preferably each chamber accommodates a single stator and corresponding rotor. However, a single chamber may accommodate more than one stator/rotor unit in some circumstances.

The advantages of such a honeycomb arrangement in a single unit are that a greater number of rotors can be accommodated in the smallest area possible since the rotors share common containment walls, and those walls internal to the structure do not need to be as thick as would be required in a single machine since a breech from one rotor chamber to another would not endanger personnel. Further, the common mass of a unitary structure of this size is sufficient to absorb the kinetic energy of a crashing rotor without any special bolting down arrangements.

The unitary structure may be fabricated to include any number of rotors depending on the total energy storage requirements of the application. The arrangement shown for illustration purposes contains 37 chambers.

The unitary structure may be formed from a plurality of extrusions cut to length and welded together. If the unitary structure is formed in this way, preferably a minimum number of different shaped extrusions are used to produce the complete unitary structure. By way of example a structure is illustrated which employs only three different extrusion types.

Preferably, each chamber is closed by an end flange incorporating a non-return valve. Although each chamber may be provided with a separate vacuum pump, it is preferable that the unitary structure be encased in a common vacuum chamber so that the common vacuum chamber can be pumped out, thereby resulting in a vacuum being produced in each rotor chamber. In the event of a crash of any single rotor in the unitary structure, the instantaneous release of light gases from the rotor material and subsequent pressure rise in the rotor chamber will cause the non-return valve to close thus isolating that chamber from the other chambers in the structure and preserving the integrity of the remaining rotors.

Although the unitary structure may be manufactured from aluminium, any other appropriate material can, of course, alternatively be used.

A common cooling system may be provided for all the stators and rotors of the complete apparatus. This is clearly preferable to having separate cooling systems for each stator/rotor unit.

Preferably the containment means includes a getter for removing gas from the chambers to improve the vacuum. Silicon or carbon based getters are the preferred choice for this.

Each stator and rotor unit can preferably store up to 20 kWhr, more preferably about 5 kWhr, of energy.

Although not specifically stated to date, it should be appreciated that any of the features of the various aspects of the present invention described herein may be combined with any other aspect to produce an energy storage and conversion apparatus which is both novel and inventive over the known prior art.

Furthermore, in an energy storage and conversion apparatus according to the present invention, an external circuit may be provided through which gases in the containment are driven by a pressure difference, the external circuit including a device for removing gas, thereby improving the vacuum within the containment.

Moreover, the speed of a rotor may be measured to provide an output indicative of the energy stored in the rotor. More preferably, a visual output is provided giving the energy available from the apparatus in real time.

In a particular embodiment, the speed of the rotor may be measured by monitoring the switching frequency of the motor/generator power electronics.

BRIEF DESCRIPTION OF THE DRAWINGS

Specific embodiments of the present invention are now described, by ways of example only, with reference to the accompanying drawings in which.

DESCRIPTION OF THE PREFERRED EMBODIMENTS

Figure 1:
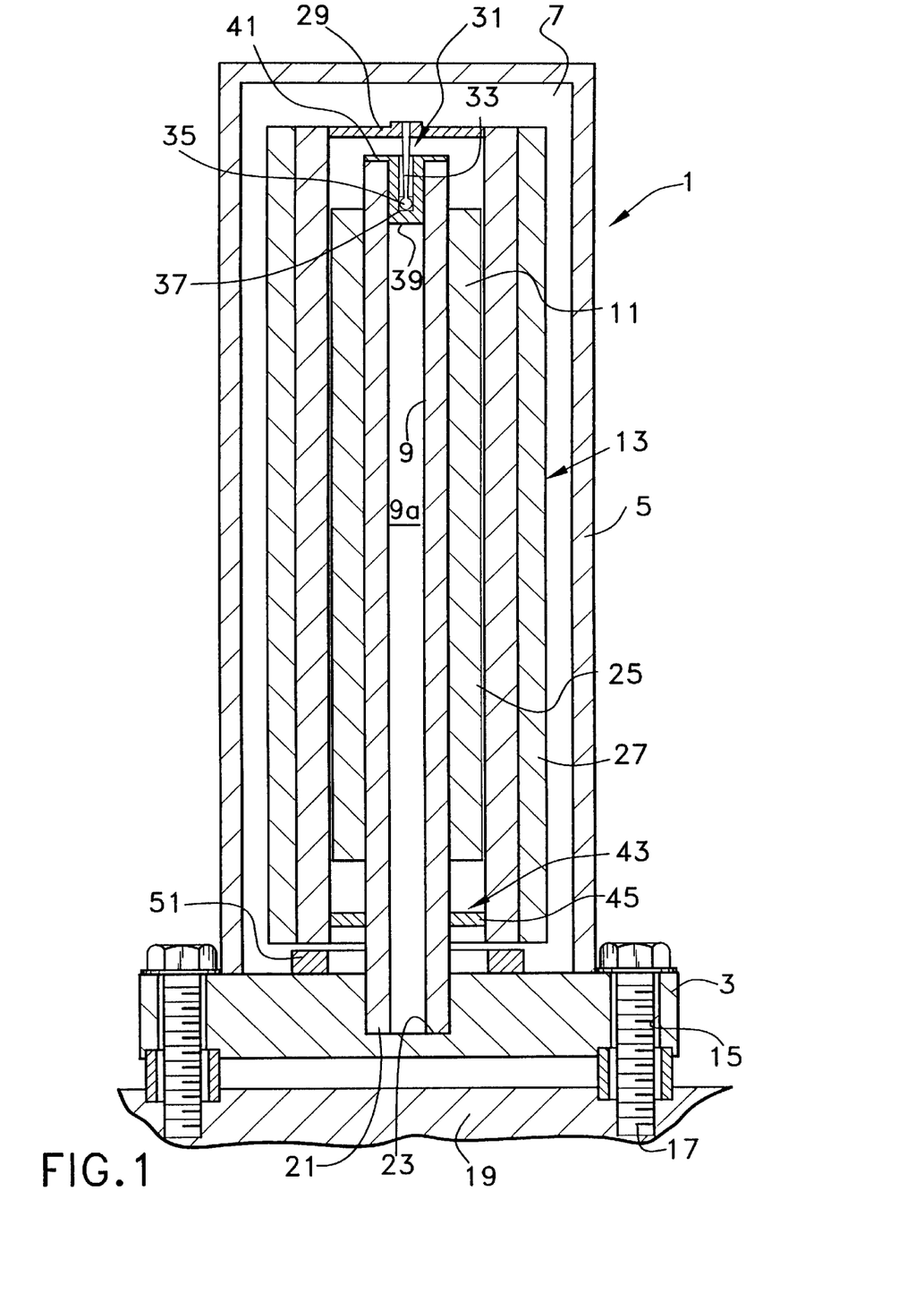
FIG. 1 is sectional side view of an energy storage and conversion apparatus according to the present invention.

With reference to FIG. 1, an energy storage and conversion apparatus 1 comprises a base member 3, a containment 5 mounted on the base member 3 defining a vacuum chamber 7, a substantially vertical shaft 9 within the vacuum chamber 7, a stator 11, mounted on the shaft 9 and a cylindrical rotor 13 which, in use, is driven by the stator 11 to store energy as kinetic energy of the rotor 13 and acts with the stator 11 as a generator to release energy. The electrical contacts to the stator 11 (for energising the stator 11 to drive the rotor 13) are not shown in the enclosed drawings, but may pass along the hollow bore 9a of the shaft 9.

The stator 11 is not shown in any detail in FIG. 1, but may be of any appropriate type incorporating a core defining a plurality of poles, such as 4 poles, about which coils are wound to produce magnetic flux which is directed by the pole faces towards the rotor 13 to cause the rotor 13 to rotate. In this way, energy can be stored as kinetic energy of the rotor 13. Conversely, if energy is to be withdrawn from the apparatus 1, the rotor 13 and stator 11 can act as a generator or generator to produce an electrical output via the power electronics (not shown) of the apparatus.

The base member 3 of the apparatus 1 has significant strength by virtue of its thickness and the material from which it is made, which may be aluminium, for example. Holes 15 through the base member 3 are shown for receiving bolts 17 for securing the base member 3 to a floor 19 or the like of considerable mass and strength. As a result, the energy storage and conversion apparatus 1 will be held firmly in position, even if the apparatus 1 fails.

In the event of a failure of the apparatus 1, the energy stored in the rotor 13 is prevented from destroying the containment 5 by virtue of the shaft 9 being solidly mounted to the base member 3. More particularly, the lower end 21 of the shaft 9 is received in a recess 23 in the base member 3 with a tight fit. Means (not shown) for strengthening the joint between the shaft 9 and the base member 3 can also be used. Further, the shaft 9 is made of a high strength material, such as aluminium, so that torque forces and energy imparted by the rotor 13 during a failure of the apparatus 1 will be transferred to the base member 3, and hence the solid support 19, via the shaft 9.

It should also be noted that the rotor 13 has a length which is at least twice its external diameter so that a tall, relatively thin apparatus 1 results. This arrangement also means that there is a significant length of shaft 9 for absorbing torque forces and energy from the rotor 13 in the event of a failure of the apparatus 1. A safer apparatus 1 is, therefore, provided and the containment 5 does not need to have a particularly large wall thickness. In practice, of course, the containment 5 would be designed to provide significant shielding against a rotor failure.

As can be seen from FIG. 1, the rotor 13 is formed with an inner layer 25 of E-glass and an outer layer 27 of carbon fibre composite. Other suitable materials could, however, alternatively be used, provided that they provide the required properties for the rotor. In this regard, the inner layer 25 of E-glass is relatively cheap and provides a reasonable amount of mass to the rotor 13. The E-glass is also able to receive magnetisable material, in the form of particles or powder, between the fibres or tows of the glass fibre in the E-glass. As can be seen from FIG. 2 which only shows the inner layer 25 of the rotor 13, the magnetisable material is preferably only entered into the inner half 25a of the inner layer 25 of the rotor 13. The outer layer 27 of the rotor 13 is included primarily to support the inner layer 25 and is, therefore, formed of a material having significant strength when spinning at high speed, such as 1,200–1,800 Hz. Carbon fibre composites are particularly suitable for this.

The rotor 13 includes an end cap 29 made of maraging steel, aluminium or carbon fibre composite which mounts a pin bearing 31 as shown in FIG. 1. The pin bearing comprises a shaft 33 carrying a spherical ball 35 at its free end. The spherical ball 35 is etched, during manufacture, such that spiral grooves are formed in the surface thereof. The spherical ball 35, or head, of the pin bearing 31 is received in a cup 37 mounted in a damper 39 positioned at the end of the shaft 9. The damper 39 extends into the bore 9a of the shaft and is retained therein by means of side flanges 41 abutting the upper end of the shaft 9. The damper 39 carries oil which acts to dampen the radial and axial motion of the cup 37 as the rotor 13 moves, thereby resulting in damping of the complete energy storage and conversion apparatus 1. The oil in the damper 39 also acts as a lubricant for the pin bearing 31 between the head 35 of the bearing 31 and the surface of the cup 37. As will be appreciated, as the rotor 13 spins, the spiral grooves in the head of the pin bearing 31 drive oil between the head 35 and the cup 37 to lift slightly the rotor 13 onto a film of oil. The rotor 13 is, therefore, free to spin with negligible friction, resulting in minimal energy being lost through the bearing. This is clearly desirable.

Figure 2:
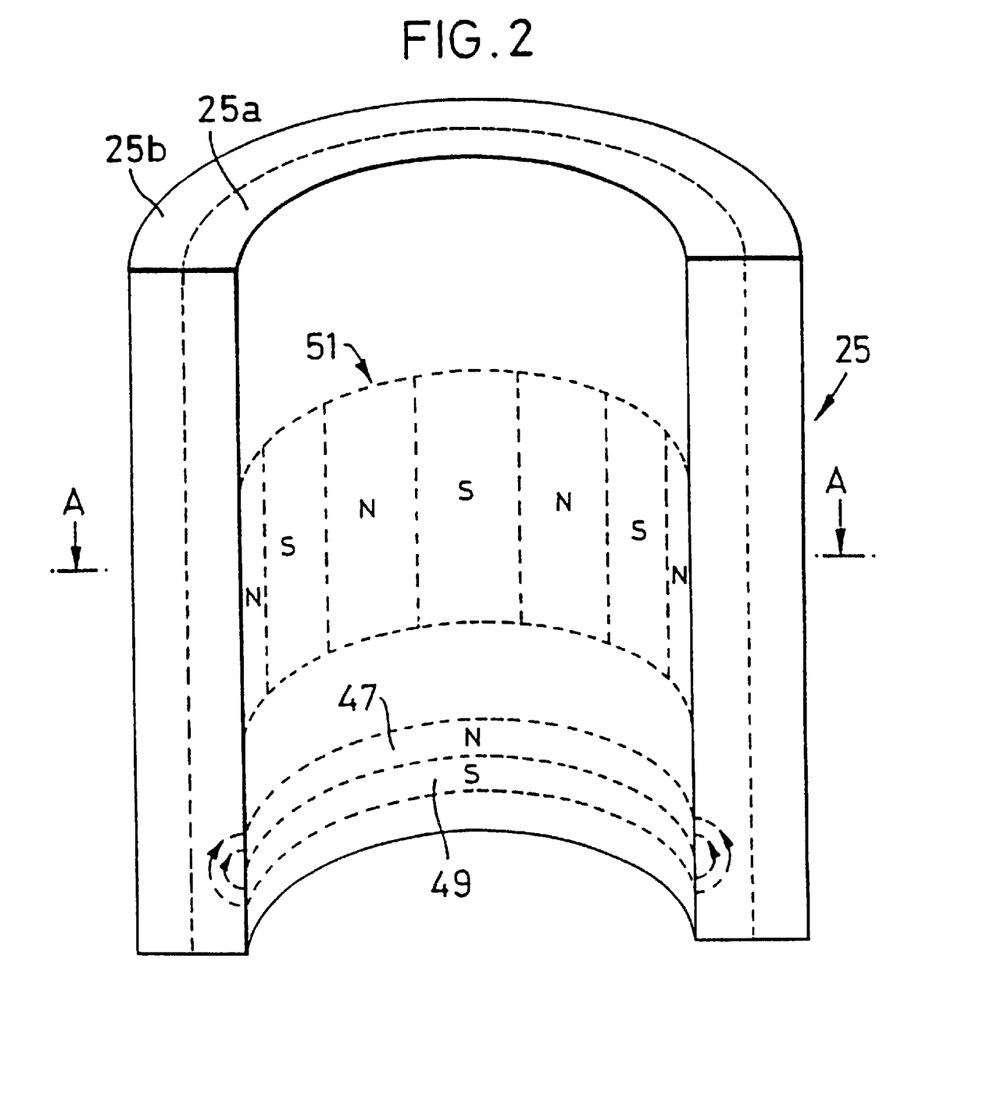
FIG. 2 is a schematic cross-sectional side view of the inner layer of a rotor, somewhat shortened, which could be used in an apparatus as shown in FIG. 1.

At the lower end of the rotor 13 a permanent magnet bearing 43 is provided to ensure, in combination with the pin bearing 31, that the rotor 13 does not clash with the stator 11. More particularly, a permanent magnet 45 is mounted on the shaft 9 with, in this case, a north pole of the magnet 45 facing the inside surface of the rotor 13. As can be seen in FIG. 2, the magnetisable material within the inner layer 25 of the rotor 13 is magnetised with a north pole 47 and a south pole 49 formed annularly. The north pole of the magnet 45 and the north pole 47 of the rotor 13 face each other and hence provide a repelling force and the south pole 49 of the rotor 13 is attracted towards the north pole of the magnet 45. By virtue of this arrangement, the rotor 13 is kept clear from the stator 11 and the rotor 13 is provided with a little lift to assist in reducing friction between the pin bearing 31 and the cup 37.

An additional axial bearing may also be provided comprising another permanent magnet 51 (see FIG. 1) for acting in conjunction with a magnetised region on the end of the rotor 13 to repel the rotor 13 and thereby lift the rotor 13.

Figure 3:
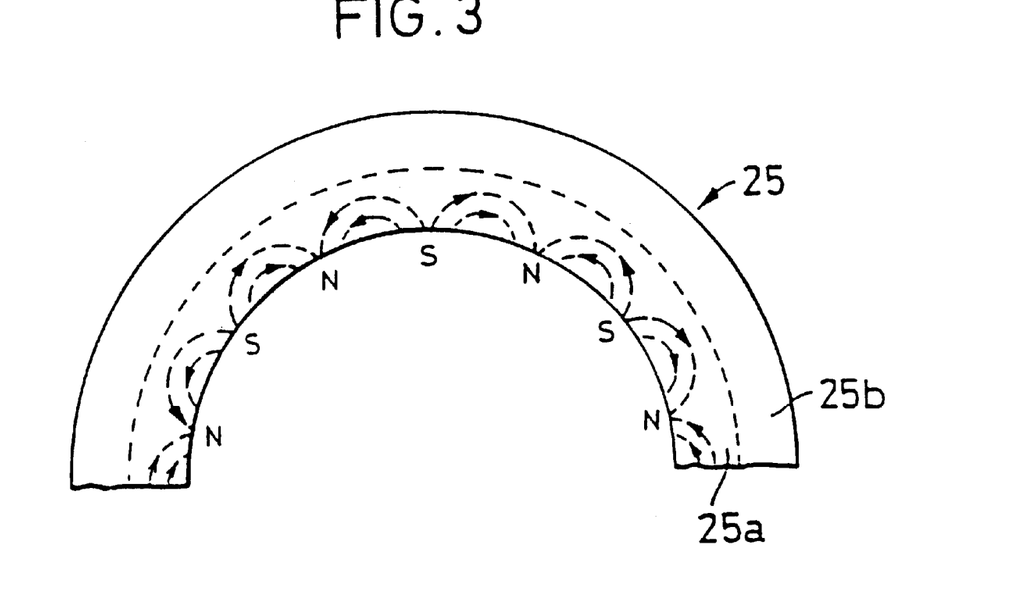
FIG. 3 is a view in the direction A—A of the rotor of FIG. 2.
Figure 4:
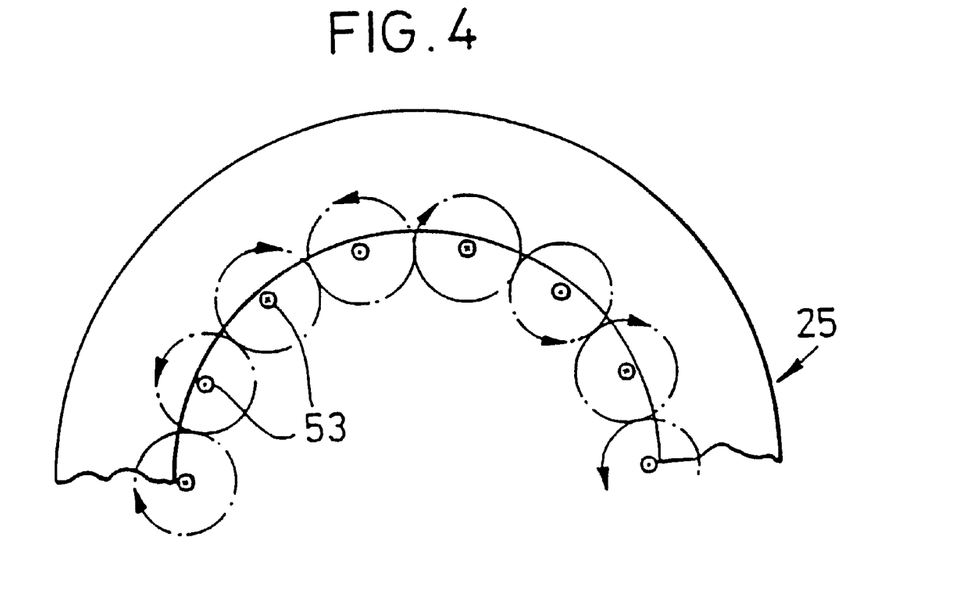
FIG. 4 is the same view as in FIG. 3, but wherein windings of a magnetising fixture for magnetising the rotor are shown.

With reference to FIGS. 2–4, an inner layer 25 of the rotor 13 which could be used in an energy storage and conversion apparatus according to the present invention is shown. In FIG. 2, however, the rotor 13 is shown significantly shortened. As can be seen, a radial multi-polar magnetisation 51, to enable the rotor to act as a motor/generator, is shown in the central region of the rotor 13. At the lower end of the rotor 13, homo-polar radial magnetisation is shown which can interact with a permanent magnet (as described above) or an electromagnet mounted on the shaft 9 to assist in suspension of the rotor 13 about the stator 11. Although only one north pole 47 and and one south pole 49 are shown on of the rotor 13, additional poles and additional permanent magnets/electromagents could be utilised to strengthen the interaction between the rotor 13 and the magnets/electro magnets mounted on the shaft 9, depending upon the forces required.

The magnetised regions 47, 49, 51 of the rotor 13 are produced by acting on virgin magnet material included in the inner half 25a of the inner layer 25 of the rotor 13 during manufacture of the rotor 13. Although it is possible to introduce pre-magnetised material into the rotor 13 and to align the material as required during manufacture of the rotor 13, a rotor 13 as described herein preferably has the magnetisation applied to the rotor 13 after the composite materials of the rotor 13 have cured. This is achieved by impressing on the virgin magnet material within the rotor 13 a magnetisation using a fixture which consists of a series of coils 53 which, when excited, produce a magnetic field of the form required in the magnet (see FIG. 4). The field required to magnetise the magnetic material, which may be ferrite, NdFeB or any other appropriate material, depends on the material type. For example, 1.5 Tesla is required for ferrite, whereas 4 Tesla is required for NdFeB. The field is produced by a single, high current pulse from a capacitor discharge unit, which current may be in the region of 30,000 amps. Once the field has been applied to the rotor 13, the fixture is removed leaving the permanent magnetisation as shown in FIGS. 2 and 3, for example. As will be appreciated, it is simply necessary to design a fixture for a particular application to achieve a desired magnetisation in the rotor 13.

Although to date an energy storage and conversion apparatus 1 has been described which incorporates a single stator 11 with a single rotor 13, the present invention further provides an energy storage and conversion apparatus comprising a plurality of stators 11, a corresponding plurality of cylindrical rotors 13 arranged to rotate about the stators 11 and containment means 100 defining a plurality of chambers 102 within a unitary structure in which the stators 11 and rotors 13 are accommodated. Such a containment 100 is shown in FIG. 5.

Figure 5:
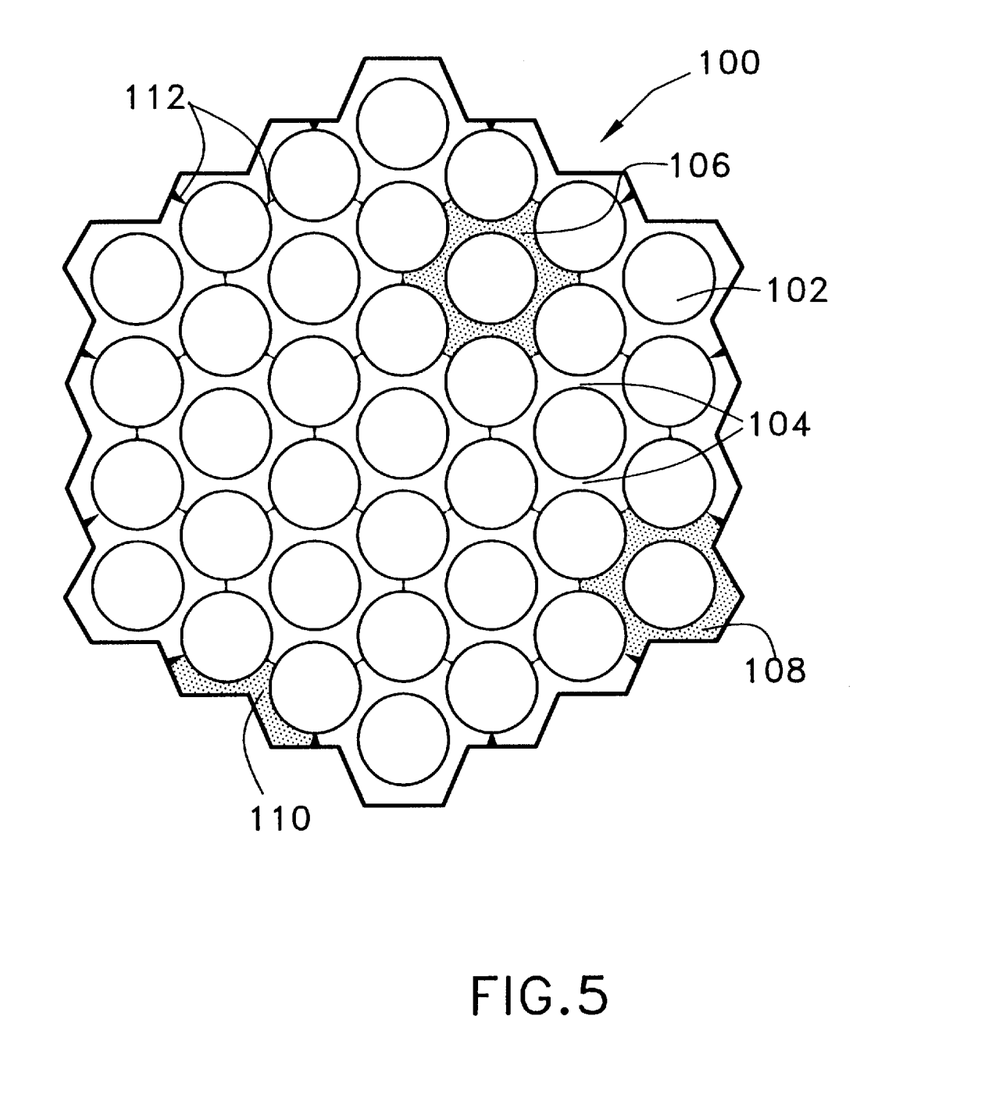
FIG. 5 is a plan view of a containment for accommodating a plurality of stator/rotor units.

The energy storage and conversion apparatus shown in FIG. 5 is extremely neat and compact by virtue of the arrangement of cylindrical chambers 102 in the unitary structure. As a result, an apparatus having the power storage and conversion capability of 37 apparatus as shown in FIG. 1 is provided without requiring an unreasonable amount of space. As will be seen from FIG. 5, adjacent vacuum chambers 102 share common containment walls 104.

The honeycomb-type structure shown in FIG. 5 is formed from three different shaped extrusions 106, 108, 110 (cf. the shaded area in FIG. 5). The extrusions are made of aluminium or any other appropriate material and are simply cut to length. Adjacent extrusions are then welded together by weld joints 112, as shown in FIG. 5. It will be understood however, that the choice of extrusion shape, and number of different shapes used to fabricate the unitary structure are based purely on commerical reasons to minimise fabrication costs and the choice of extrusion shapes and numbers of different shapes used does not affect the validity of the final structure.

Although in theory each chamber 102 could have an end flange at either end and a separate means for preserving the vacuum in the chamber 102, an apparatus according to the present invention ideally has either an external casing (not shown) around the complete unitary structure or an end capping covering at least one end of the unitary structure. In either event, each chamber 102 should still have its own end flanges (not shown); a non-return valve may then be provided in each end cap protected by the outer capping or casing. In such an arrangement, a single vacuum pumping device can be provided for the complete unitary structure, gas within the individual chambers 102 being drawn out through the non-return valves to be removed by the main vacuum pump. Further, if an individual stator 11/rotor 13 unit fails, resulting in molecules being released to the rotor chamber, the remaining units will not be affected due to the protection provided by the closing of the non-return valve.

Figures 6A, 6B:
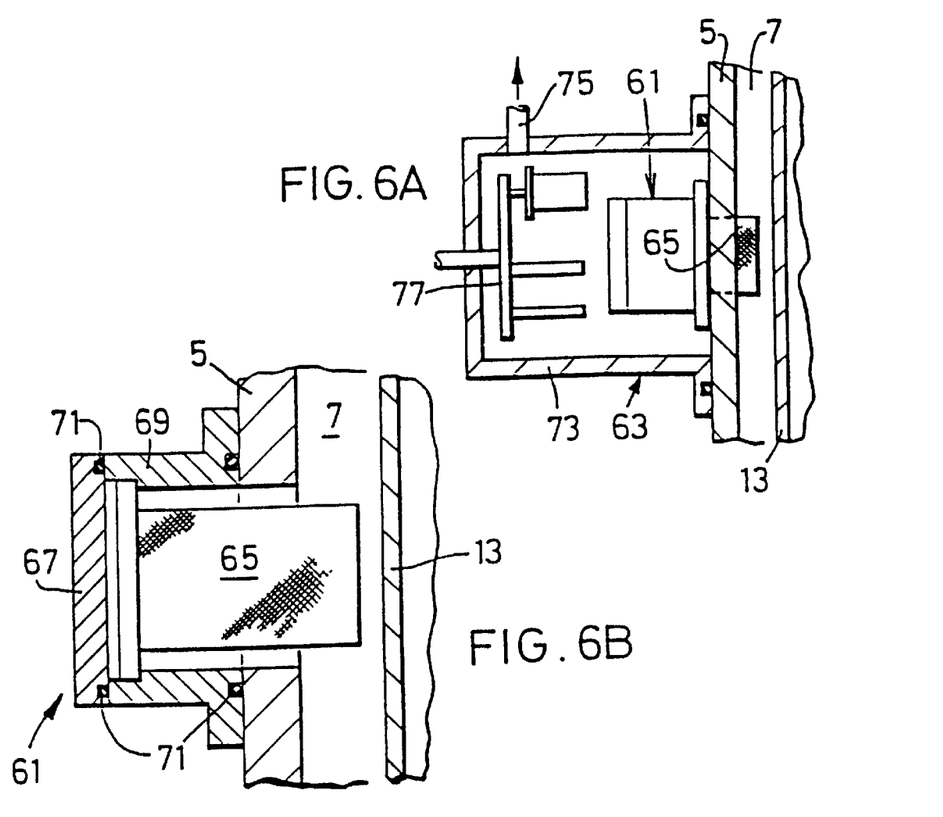
FIG. 6A is a schematic side view of a maintenance bell for a getter housing assembly mounted on a side of an energy storage and conversion apparatus containment wall.
FIG. 6B is an enlarged side view of the getter housing assembly shown in the maintenance bell of FIG. 6A.

Moving on now to FIGS. 6A and 6B, a getter housing assembly 61 and maintenance bell 63 are shown. The getter housing assembly 61 provides a mount for a getter material 65, such as silica gel, activated charcoal (possibly in the form of a cloth or fabric formed by pyrolysis), which absorbs gas molecules to improve the vacuum within the vacuum chambers 7, 102. In this regard, as will be appreciated, the better the vacuum within the vacuum chamber 7, 102, the less friction will result and, accordingly, less energy will be lost from the rotor 13. Hence, a higher vacuum is essential for successful running of an energy storage and conversion apparatus according to the present invention.

With specific reference to FIG. 6B, the getter material 65 is mounted on an end cap 67 of the getter housing assembly 61 such that the getter material 65 is positioned adjacent to the rotor 13. A cylindrical wall 69 of the getter housing 61 is attached to the containment 5 of an energy storage and conversion apparatus 1. Seals 71 are provided between the getter housing 61 and the containment 5, and between the end cap 67 and the cylindrical wall 69 of the housing 61. To enable the getter 65 to be serviced or replaced, the maintenance bell 63 (FIG. 6A) is used. This incorporates a wall 73 for encasing the getter housing 61, an access 75 to a vacuum pump for producing a high vacuum within the maintenance bell 63 and robotic or other maintenance tools 77 for interacting with the getter housing 61. Hence, when the maintenance bell 63 has been attached to the containment 5 and a vacuum has been produced within the maintenance bell 63, the tools 77 can be used to remove the end cap 67 and attached getter material 65 from the getter housing 61. Replacements of the getter material 65 can then be achieved without spoiling the vacuum around the rotor 13 within the vacuum chambers 7, 102 of the energy storage and conversion apparatus 1. Once replacement of the getter material 65 has been achieved, the end cap 67 of the getter housing 61 is replaced prior to the maintenance bell 63 being removed.

Figure 7:
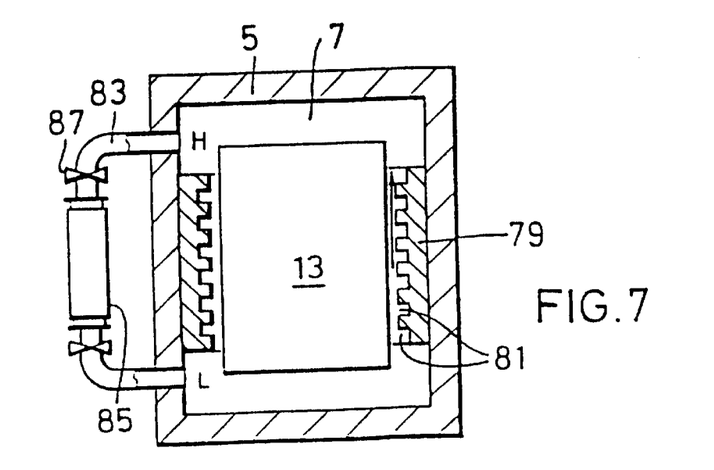
FIG. 7 is a schematic side view of an energy storage and conversion apparatus according to the present invention incorporating an external circuit for removing gas from the vacuum chamber of the apparatus.

Another form of apparatus for removing gases present in the vacuum chamber 7 of an energy storage and conversion apparatus 1 according to the present invention is shown in FIG. 7. In this Figure, a molecular pump 79, comprising a plurality of helical grooves 81, faces the outside of the rotor 13. As the rotor 13 rotates, gases produced by off-gasing from the rotor, or other gases within the containment 5, are driven by the molecular pump 79 upwards in FIG. 7. This results in a low pressure region being formed towards the bottom of the vacuum chamber 7 and a high pressure region being formed towards the top of the vacuum chamber 7.

An external pipe circuit 83 is shown incorporating a gas remover device 85, which may be an ionisation pump or a getter material. Hence, due to the pressure differential between the high pressure region and the low pressure region in the vacuum chamber 7, gas is driven through the remover device 85 and is thereby removed from the system. An improved vacuum can therefore be achieved within the vacuum chamber 7.

To assist in servicing of the remover device 85, valves 87 are provided on either side of the remover device 85. When these valves 87 are closed, the remover device 85 can be disconnected from the pipe circuit 83 for servicing. The remover device 85 then simply needs to be reinstated into the circuit 83 and that part of circuit 83 between the valves 87 needs to be pumped out to produce a vacuum prior to the valves 87 being reopened. Hence, a very simple and user friendly arrangement is provided for improving the vacuum within the vacuum chamber 7 of the energy storage and conversion apparatus 1.

Although not shown in the drawings, the speed of the rotor 13 can be measured, such as by monitoring the switching frequency of the motor/generator power electronics, to provide an output indicative of the energy stored in the rotor 13 at any particular time. More preferably, a visual output is provided giving the energy available from the energy storage and conversion apparatus 1 in real time.

It will of course be understood that the present invention has been described above purely by way of example, and that modifications of detail can be made within the scope of the invention.

What is claimed is:

1. An energy storage and conversion apparatus comprising
   a containment defining a vacuum chamber,
   a substantially vertical shaft within the vacuum chamber,
   a stator on the shaft, and
   a cylindrical rotor which, in use, is driven by the stator to store energy as kinetic energy of the rotor and acts with the stator as a generator to release energy,
   characterized in that the rotor comprises an inner layer of glass fibre and on outer layer of carbon fibre, the thickness of the inner layer being about two thirds of the thickness of the complete rotor.

2. An apparatus as claimed in claim 1, wherein the inner layer contains a material magnetized to form a multipolar magnetization for interaction with the stator, during use.

3. An apparatus as claimed in claim 2, wherein the magnetized material is a powder introduced into the inner layer during manufacture.

4. An apparatus as claimed in claim 2, wherein the magnetized material is ferrite or NdFeB.

5. An apparatus as claimed in claim 2, wherein the magnetized material extends from the inner surface of the inner layer to about half way through the inner layer.

6. An apparatus as claimed in claim 1, wherein the inner layer contains a material magnetized to form at least one homo-polar radial magnetization for interaction with a magnet mounted on the shaft to produce a bearing for the rotor.

7. An apparatus as claimed in claim 1, wherein the inner and outer layers are strain matched to prevent separation during use.

8. An apparatus as claimed in claim 1, wherein an end cap of the rotor assists in suspending the rotor on the shaft.

9. An apparatus as claimed in claim 1, wherein the speed of the rotor is measured to provide an output indicative of the energy stored in the rotor.

10. An apparatus as claimed in claim 9, wherein a visual output is provided giving the energy available from the apparatus in real time.

11. An apparatus as claimed in claim 9, wherein the speed of the rotor is measured by monitoring the switching frequency of the motor/generator power electronics.

12. An apparatus as claimed in claim 1 wherein an external circuit is provided through which gases in the containment are driven by a pressure difference, the external circuit including a device for removing gas thereby improving the vacuum within the containment.

* * * * *